(12) United States Patent
Bradshaw (10) Patent No.: US 7,794,354 B2
(45) Date of Patent: Sep. 14, 2010

(54) VARIABLE SPEED TRANSMISSION

(76) Inventor: Jeffrey W. Bradshaw, P.O. Box 16465, Jackson, MS (US) 39236

( * ) Notice: Subject to any disclaimer, the term of this patent is extended or adjusted under 35 U.S.C. 154(b) by 422 days.

(21) Appl. No.: 12/028,644

(22) Filed: Feb. 8, 2008

(65) Prior Publication Data

US 2009/0203485 A1    Aug. 13, 2009

(51) Int. Cl.
F16H 3/44    (2006.01)
(52) U.S. Cl. .................. 475/282; 475/288; 475/290; 475/302
(58) Field of Classification Search ............. 475/207, 475/219, 269, 271, 282, 288, 290, 296, 302, 475/313, 319, 330
See application file for complete search history.

(56) References Cited

U.S. PATENT DOCUMENTS

| | | | |
|---|---|---|---|
| 1,175,677 A | 3/1916 | Barnes | |
| 1,353,775 A | 9/1920 | Molyneux | |
| 1,858,696 A | 7/1931 | Weiss | |
| 2,015,638 A | 9/1933 | Kohn | |
| 2,320,854 A | 9/1940 | Dethridge | |
| 2,543,584 A | 6/1944 | Meinecke | |
| 3,587,347 A | 6/1971 | Hanzi et al. | |
| 4,205,563 A | 6/1980 | Gorrell | |
| 4,936,165 A | 6/1990 | Doyle et al. | |
| 5,860,884 A | 1/1999 | Joliff | |
| 5,971,881 A | 10/1999 | Jolliff | |
| 6,267,703 B1 * | 7/2001 | Park | 475/286 |
| 6,811,508 B2 * | 11/2004 | Tumback | 475/5 |
| 7,037,230 B2 * | 5/2006 | Dupriez | 475/5 |
| 7,056,254 B1 | 6/2006 | Fragnito | |
| 7,074,155 B2 | 7/2006 | Miller | |
| 7,086,981 B2 | 8/2006 | Ali et al. | |
| 2003/0119620 A1 * | 6/2003 | Zwilling et al. | 475/219 |
| 2007/0173366 A1 | 7/2007 | Goma Ayats | |

* cited by examiner

*Primary Examiner*—David D Le
(74) *Attorney, Agent, or Firm*—Scott T. Griggs; Griggs Bergen LLP (57) ABSTRACT

A variable speed transmission is disclosed. In one embodiment, a two shaft and two opposing planetary gearset arrangement is utilized. Drive and driven shafts are connected as respective inputs and outputs to opposing planetary gears of the planetary gearsets. Respective sun gears are rotatably coupled to each end of an intermediary shaft which traverses the span between the planetary gearsets. Respective ring gears are meshed to a pair of spur gears coupled to a secondary shaft which also traverses the span. In operation, the coordinated actuation of a pair of clutch-brake assemblies associated with the intermediary and secondary shafts substantially continuously varies the transmission of torque from the drive shaft to the driven shaft.

23 Claims, 6 Drawing Sheets

VARIABLE SPEED TRANSMISSION

TECHNICAL FIELD OF THE INVENTION

This invention relates, in general, to variable speed transmissions for vehicles or other machines and, in particular, to a variable speed transmission which utilizes epicyclic gear arrangements or planetary gearsets to provide a large range of gear ratios.

BACKGROUND OF THE INVENTION

A typical mechanical transmission for a vehicle or other machine permits only a selection between a few discrete gear ratios. A variable speed transmission, on the other hand, can be varied continuously within a finite range to provide a large or infinite number of possible gear ratios. This enables the relationship between the speed of the prime mover, such as a vehicle engine, and the driven speed of the rotary load, such as a wheel, to be selected within a continuous range. The result is a more efficient engine and improved fuel economy. The existing variable speed transmissions, however, can use improvements with respect to reliability, function, and simplicity.

SUMMARY OF THE INVENTION

A variable speed transmission is disclosed which provides improvements with respect to reliability, function, and simplicity. Without limiting the scope of the present invention, its background will be described with reference to a transmission in a vehicle. The variable speed transmission presented herein enables the relationship between the speed of a vehicle, engine, and the driven speed of the wheels to be selected within a continuous range. This can provide better fuel economy than other transmissions by enabling the engine to run at its most efficient speeds within a narrow range. The variable speed transmission described herein also avoids gear slippage and provides a tight, compact form factor that is light weight and avoids the problems traditionally associated with belt and chain-driven variable speed transmissions.

In one embodiment, a two shaft and two opposing planetary gearset arrangement is utilized. Drive and driven shafts are connected as respective inputs and outputs to opposing planetary gears of the planetary gearsets. Respective sun gears are rotatably coupled to each end of an intermediary shaft which traverses the span between the planetary gearsets. Respective ring gears are meshed to a pair of spur gears coupled to a secondary shaft which also traverses the span. In operation, the coordinated actuation of a pair of clutch-brake assemblies associated with the intermediary and secondary shafts substantially continuously varies the transmission of torque from the drive shaft to the driven shaft.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a perspective view of one embodiment of a variable speed transmission that includes a housing;

FIG. 3a is a top plan view of one embodiment of a hub which forms a portion of the housing;

FIG. 3b is a bottom plan view of the hub of FIG. 3a;

FIG. 4a is a top plan view of one embodiment of an end cap which forms a portion of the housing;

FIG. 4b is a bottom plan view of the end cap of FIG. 4a;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figures 1, 3A, 3B, 4A, 4B:
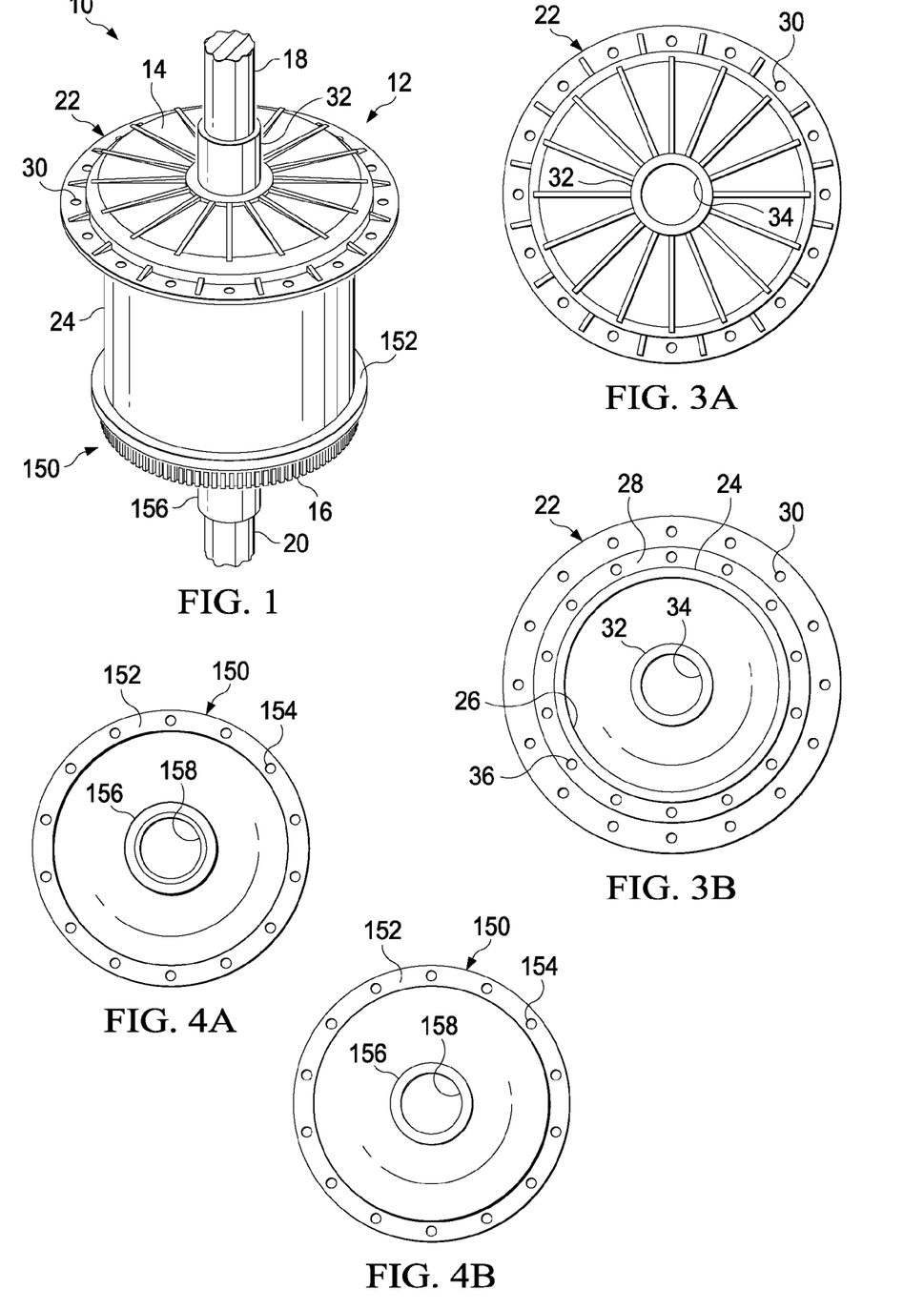
Figure 2:
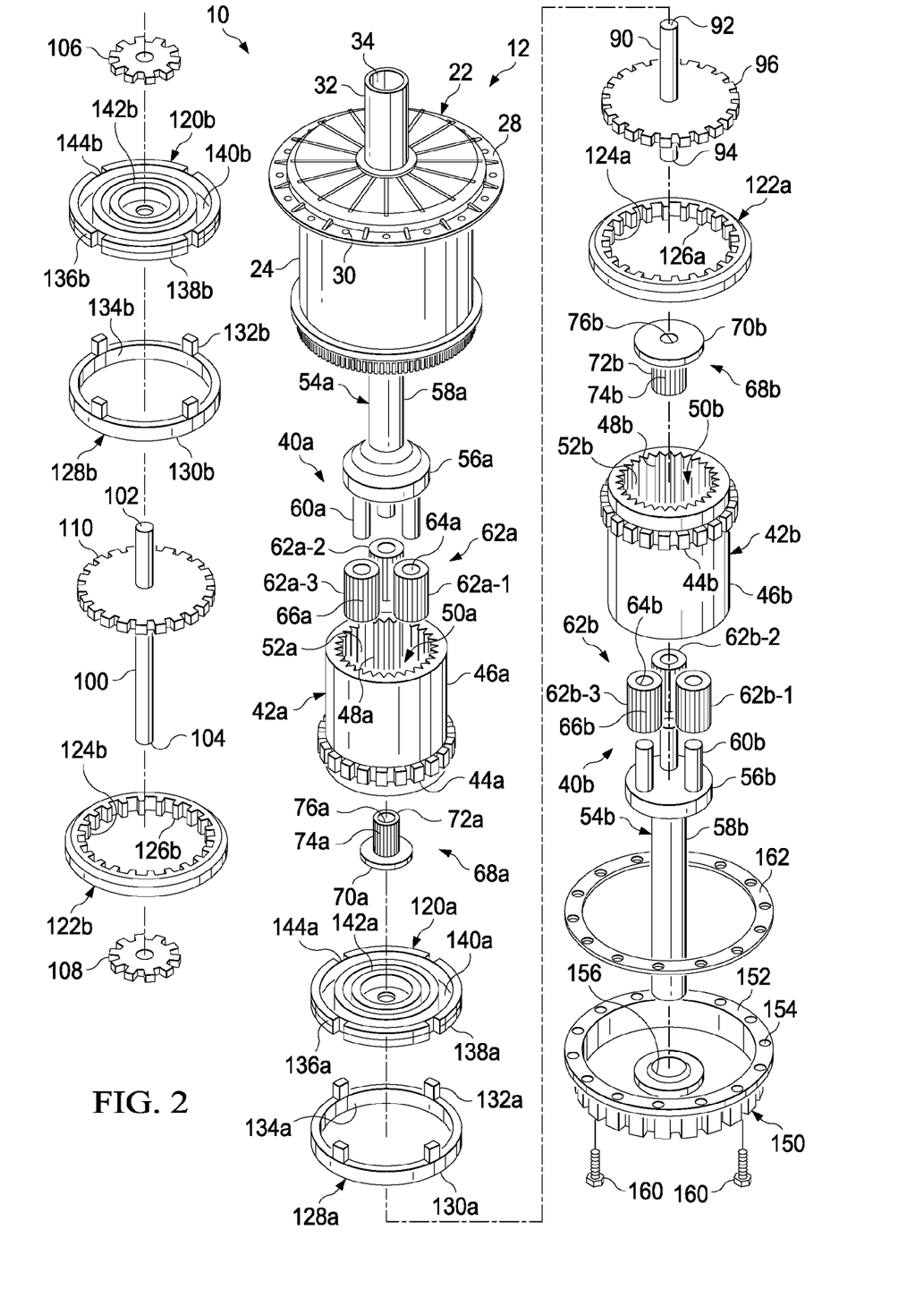
FIG. 2 is an exploded view of the variable speed transmission.
Figure 5:
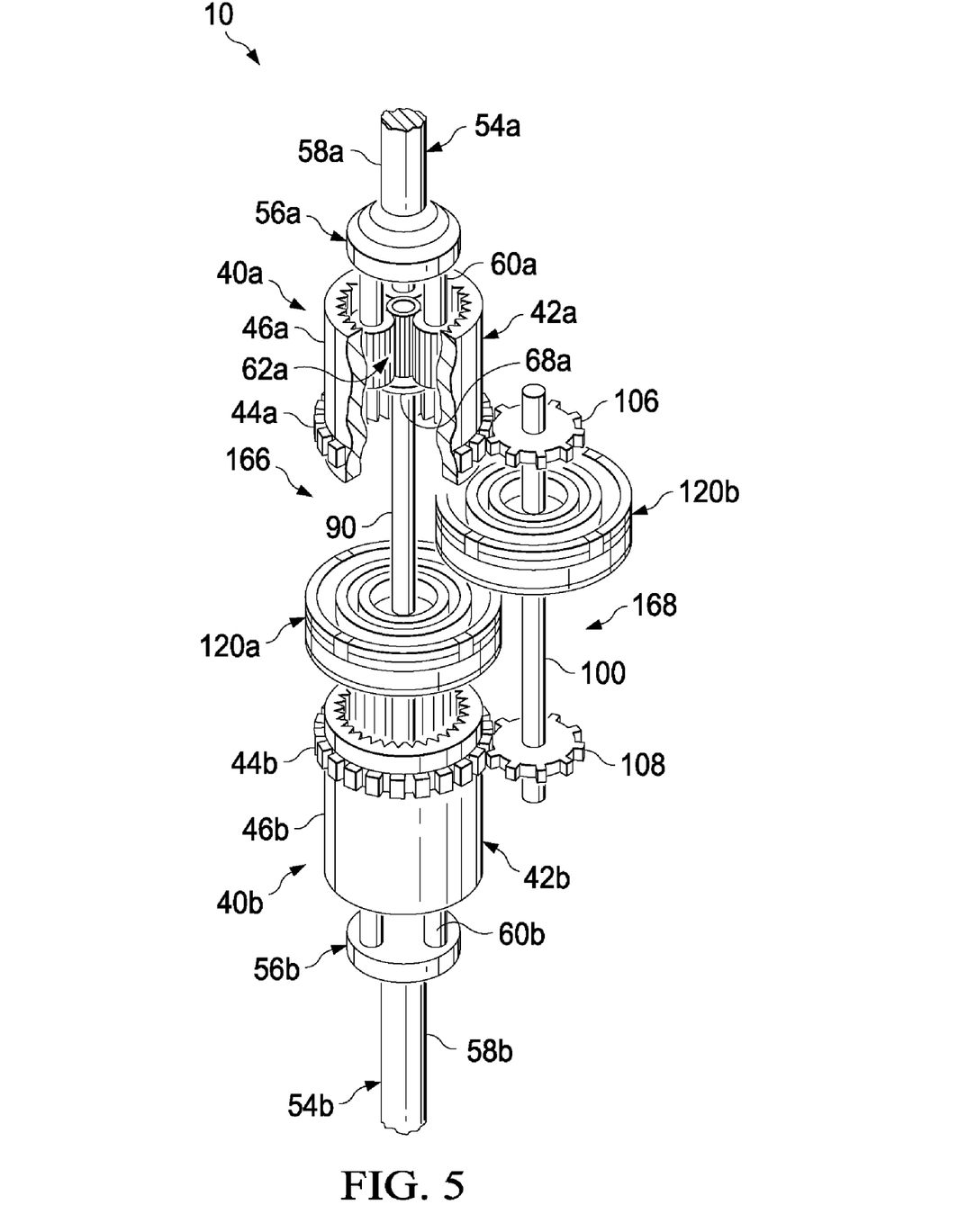
FIG. 5 is a perspective view, with a partial cutaway, of the variable speed transmission also with the housing removed for purposes of illustration.
Figure 6:
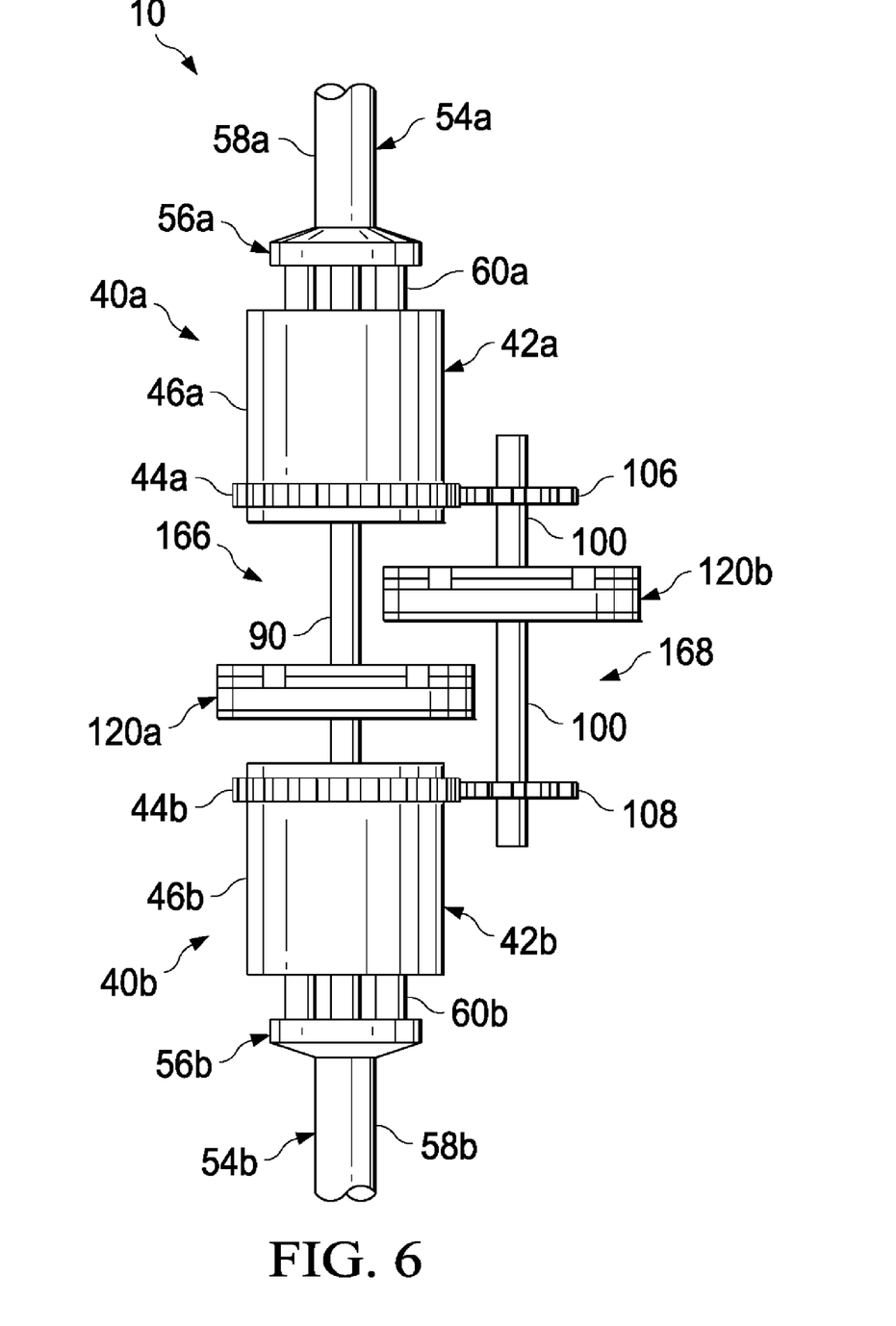
FIG. 6 is a top plan view of the variable speed transmission without the housing.

Referring initially to FIGS. 1 through 4, therein is depicted one embodiment of a variable speed transmission that is generally designated 10 and includes a housing 12 having ends 14, 16. It should be appreciated that for purposes of illustration the housing 12 is depicted in FIGS. 1 through 4B and it is not depicted in FIGS. 5 and 6. Returning to FIGS. 1 through 4, a drive shaft 18 and a driven shaft 20 are journalled in the opposed ends 14, 16 and may be axially aligned. A hub 22 having a generally annular shape includes a body 24 having a cavity 26 and a flange 28 extending radially and circumferentially thereabout. A plurality of apertures 30 extend axially through the flange 28 and are disposed circumferentially about a periphery thereof. A projection 32 has an inner surface 34 that acts as a concentric bearing surface for the drive shaft 18. As an alternative, although not illustrated, anti-friction bearing elements such as trunions may be provided. Openings 36, which are used for securing the housing in a closed, operational position, are circumferentially spaced about an edge of the body 24 of the hub 22. It should be appreciated that although the variable speed transmission 10 is depicted with a particular housing 12, any type and form of housing may be utilized and the particular housing utilized will depend on the particular application. Additionally, various components may be integrally formed as the particular manufacturing process selected requires. Further, the variable speed transmission 10 presented herein may be employed in any technology requiring a speed-power conversion including agricultural, industrial, construction, mining, and vehicle applications.

A planetary gearset 40a which includes a ring gear 42a having a plurality of teeth defining an exterior gear surface 44a and an extension 46a extending axially and partially disposed within the projection 32 as well as the cavity 26 of the body 24. The extension 46a has a cavity 48a and an aperture 50a extending therethrough having a plurality of teeth extending therefrom providing an interior gear surface 52a. The ring gear 42a is a reactionary member that may be free wheeling or locked by way of a clutch-brake assembly to be described hereinbelow.

The planetary gearset 40a also includes a carrier 54a disposed within the cavity 48a of the ring gear 42a. The carrier 54a has a generally annular and planar base 56a and a rotatable member 58a extending axially from the base 56a. The rotatable member 58a couples to or forms a portion of the driven shaft 20. A plurality of arms 60a extend from the base and are disposed circumferentially thereabout for a function to be described. In one implementation, the rotatable member 58a and the drive shaft 18 are integrally formed.

The planetary gearset 40a includes a corresponding plurality of planetary gears 62a disposed on the arms 60a of the carrier 54a. As depicted, the three planetary gears 62a, which are individually 62a-1, 62a-2, and 62a-3, complement the three arms 60a. Each of the planetary gears 62a extends axially and is generally annular in shape. Additionally, for each of the planetary gears 62a, an aperture 64a extends axially therethrough to be disposed about the arms 60a of the carrier 54a. A plurality of teeth 66a are disposed thereabout. The planetary gears 62a are located such that the teeth 66a are mated in an intermeshing relationship with the interior gear surface 52a of the ring gear 42a.

A sun gear 68a forms a portion of the planetary gearset 40a and is disposed within the cavity 48a of the ring gear 42a. More particularly, the sun gear 68a has a generally annular planar base 70a and a shaft 72a extends axially from the base 70a. A plurality of teeth 74a are located circumferentially thereabout. The shaft 72a is disposed between the three planetary gears 62a-1, 62a-2, 62a-3 such that the teeth 74a of the sun gear 68a engage the teeth 66a of the planetary gears 62a in an intermeshing relationship. A receptacle 76a extends through the base 70a and shaft 72a of the sun gear 68a. Similar to the ring gear 42a, the sun gear 68a is a reactionary member that may be free wheeling or locked by way of a clutch-brake assembly to be described hereinbelow.

An intermediary shaft 90 has ends 92, 94 and the end 92 is received in the receptacle 76a of the sun gear 68a and, in one embodiment, the intermediary shaft 90 extends in an axial alignment with the drive shaft 18 and the driven shaft 20. It should be appreciated that in another embodiment, the intermediary shaft 90 may be integrally formed with the sun gear 68a. A gear 96 is disposed between the two ends of the intermediary shaft 90.

A secondary shaft 100 is journalled for rotation to the interior of the body 24 of the hub 22 by interior projections (not illustrated) that traverse the cavity 26. The secondary shaft 100 has ends 102, 104 and is axially aligned and spaced apart in parallel to the intermediary shaft 90. The secondary shaft 100 has spur gears 106, 108 respectively rotatably mounted at the ends 102, 104. The spur gear 106 meshes for opposing motion with the exterior gear surface 44a of the ring gear 42a of the planetary gearset 40a. Similar to the intermediary shaft 90, a gear 110 is disposed between the two ends 102, 104 of the secondary shaft 100.

Another planetary gearset 40b is disposed opposite to the planetary gearset 40a at the end 94 of the intermediary shaft 90 and the end 104 of the secondary shaft 100. In one embodiment, the planetary gearset 40b is similar to the planetary gearset 40a and the components of the planetary gearset 40b are labeled with the letter "b" to represent a structural and functional correspondence to the components of the planetary gearset 40a having the same number and the letter "a". It should be appreciated, however, that the design and functionality of the planetary gearsets 40a, 40b may differ.

The planetary gearset 40b is rotatably coupled to the driven shaft 20 as well as the intermediary shaft 90 and the secondary shaft 100. More particularly, the planetary gearset includes a sun gear 68b and planetary gears 62b, individually 62b-1, 62b-2, and 62b-3, drivingly connected to the driven shaft 20 and disposed in an intermeshing relationship with the sun gear 68b. Additionally, a ring gear 42b is included having an interior gear surface 52b meshing with the planetary gears 62b and an exterior gear surface 44b. The sun gear 68b is coupled to the intermediary shaft 90 or may be integrally formed therefrom. The planetary gearset 40b is rotatably coupled to the secondary shaft 100 by way of the spur gear 108 rotatably mounted to the secondary shaft 100 and meshed for opposing motion with the exterior gear surface 44b of the ring gear 42b.

The variable speed transmission 10 includes a clutch-brake assembly, which is illustrated as an electromagnetic clutch-brake and generally indicated at 120a, contained within the cavity 26 of the body 24 and circumferentially disposed about the intermediary shaft 90. A friction plate 122a, being generally annular in shape with an aperture 124a extending axially therethrough, is located within the cavity 26 and about the gear 96 disposed on the intermediary shaft 90. Teeth 126a are disposed circumferentially about the aperture 124a and are operable to engage the gear 96.

A bobbin subassembly 128a includes a bobbin 130a being generally planar and having at least one foot 132a extending axially therefrom. A coil 134a disposed adjacent to the bobbin may be an annular winding of copper wire which is connected to a source of power such as a controller (which is not depicted in FIGS. 1 through 6).

A magnetic subassembly 136a is disposed adjacent the bobbin subassembly 128a and within the cavity 26 of the body 24. A magnet 138a is disposed about the periphery of a generally annular and planar base 140a. An annular insert 142a is disposed within the base 140a, which may include a corresponding number of recesses 144a for accepting the feet 132a of the bobbin 130a. In this configuration, when the coil 134a receives power, the magnet 138a creates an electromagnetic field that stops the rotation of the friction plate 122a.

Another clutch-brake assembly in the form of an electromagnetic clutch-brake, which is labeled 120b, is associated with the secondary shaft 100. The electromagnetic clutch-brake 120b has a similar design and functionality to the electromagnetic clutch-brake 120a associated with the intermediary shaft 90. Again, the components of the electromagnetic clutch-brake are labeled with the letter "b" to represent a structural and functional correspondence to the components of the electromagnetic clutch-brake 120a having the same number and the letter "a". It should be appreciated, however, that the design and functionality of the electromagnetic clutch-brakes 120a, 120b may differ. Additionally, it should be understood that to reduce the consumption of space, the positions of the electromagnetic clutch-brakes 120a, 120b may be offset by staggering the respective positions of gear 96 of the intermediary shaft 90 and the gear 110 if the secondary shaft 100. The electromagnetic clutch-brake 120b is located circumferentially about the secondary shaft 100 to engage the gear 110 disposed on the secondary shaft 100 and selectively stop the rotation of the secondary shaft 100, thereby controlling the transfer of torque therethrough.

An end cap 150 includes a generally annular shape that complements the body 24 of the hub 22. A flange 152 extends radially and circumferentially from the end cap 150. A plurality of holes 154 extend axially through the flange 152 and are disposed circumferentially about a periphery thereof. The holes 154 compliment the openings 36 of the body 24 of the hub 22. A projection 156 has an inner surface 158 that acts as a concentric bearing surface for receiving the driven shaft 20. To form the housing 12, the end cap 150 is secured to the hub 22 by aligning the holes 154 with the openings 36 and securing the end cap 150 thereto with the use of fasteners 160 such as bolts. A seal 162 may be used to maintain the environment inside of the housing 12 and exclude contamination.

When the electromagnetic clutch-brake 120a is activated, the gear 96 is locked by the friction plate 122a to selectively hold the intermediary shaft 90 stationary, thereby discontinuing the transfer of torque through the intermediary shaft 90 from the sun gear 68a of the planetary gearset 40a to the sun gear 68b of the planetary gearset 40b. Similarly, when the electromagnetic clutch-brake 120b is activated, the gear 110 is locked to selectively hold the secondary shaft 100 stationary. This discontinues the transfer of torque through the secondary shaft 100 from the ring gear 42a to the ring gear 42b. As will be discussed in further detail hereinbelow, with one or more controllers the actuation of the electromagnetic clutch-brakes 120a, 120b may be regulated to coordinate and continuously vary the transmission of torque from the drive shaft 18 to the driven shaft 20. Additionally, with respect to the clutch-brake 120a, the clutch-brake 120a may operate to prevent rotation in one direction while permitting rotation in the other direction. By way of example, the clutch-brake 120a may operate to prevent counterclockwise rotation of the intermediary shaft 90 while permitting clockwise rotation of the intermediary shaft 90. It should be appreciated that although the clutch-brake assembly was illustrated as an electromagnetic clutch-brake, other types of clutch-brake assemblies are within the teachings of the present invention. By way of example and not by way of limitation, single plate, multi-plate, and hydrostatic brakes, oil-pump brake assemblies, and hydraulic clutch-brake assemblies are all within the teachings of the present invention. Further, the clutch-brakes 120a, 120b may differ with respect to structure and function.

Through selection of the gear sizes, including the gear sizes associated with the planetary gears 62a, 62b, the ring gears 42a, 42b, sun gears 68a, 68b, and each of the spur gears 106, 108, two geartrains 166, 168 are provided that each have a different gear ratio that define the upper and lower limits of a speed-power range. By way of example, the two gear ratios may be provided by maintaining the identicality of pitch and/or differing the pitch between the exterior gear surface 44a and the spur gear 106a; and/or the exterior gear surface 44b and the spur gear 108.

This configuration allows the variable speed transmission 10 to continuously vary speed and power within the speed-power range defined by the two geartrains 166, 168 by controlling and selectively stopping the electromagnetic clutch-brakes 120a, 120b. The geartrain 166 includes the planetary gears 62a drivenly connected to the drive shaft 18 and disposed in an intermeshing relationship with the sun gear 68a. In the geartrain 166, which defines a first gear ratio, the sun gear 68a is rotatably coupled to the intermediary shaft 90 which supplies torque to the sun gear 68b. In turn, the sun gear 68b meshes with the planetary gears 62b drivenly connected to the driven shaft 20.

The geartrain 168, which defines a second gear ratio, includes the planetary gears 62a drivenly connected to the drive shaft 18 and disposed in an intermeshing relationship with the ring gear 42a. The secondary shaft 100 having the pair of spur gears 106, 108 is rotatably coupled to the ring gears 42a, 42b. The ring gear 42b meshes with the planetary gears 62b which are drivenly connected to the driven shaft 20. In one implementation, the planetary gearsets 40a, 40b may be considered a compound planetary gearset 40 that is interposed for rotation between the drive shaft 18 and the driven shaft 20. In this implementation and others, the sun gears 68a, 68b may form a common sun gear having a carrier shaft which may be embodied by the intermediary shaft 90.

FIGS. 7 through 10 depict one embodiment of the variable speed transmission. Each of the planetary gearsets 40a, 40b includes three members; namely, the respective sun gears 68a, 60b, the respective ring gears 42a, 42b, and the respective planetary gears 62a, 62b which are held in proper relation to the sun gears 68a, 60b and the ring gears 42a, 42b. In this configuration, the planetary gears 62a, 62b are free to rotate on their on axes while they "walk" around the respective sun gears 68a, 60b and/or inside the respective ring gears 42a, 42b. By way of example and not by way of limitation, by selectively stopping the components of the planetary gearsets 40a, 40b, the variable speed transmission, depending on the configuration, continuously shifts between the following non-exhaustive list of exemplary functions:

reduce output speed and increase torque in a gear reduction configuration by selecting the second geartrain for speed-torque transmission;

increase output speed while reducing torque in an overdrive configuration by selecting the first geartrain for speed-torque transmission;

reverse output direction in a reverse gear configuration by implementing a reverse subassembly reversing the direction of output torque;

serve as a solid unit to transfer power in a 1:1 ratio configuration; and/or freewheel to stop power flow for a park or neutral application by selectively stopping the transfer of speed and torque from the drive shaft to the driven shaft.

With respect to the configuration illustrated in FIGS. 7-10, the first geartrain 166 defines the upper gear ratio and the second geartrain 168 defines the lower gear ratio and the variable speed transmission 10 continuously varies the speed-torque ratio therebetween by selectively actuating one or both of the electromagnetic clutch-brakes 120a, 120b. Table I, Continuous Variability of Variable Speed Transmission, indicates various exemplary transmission states through which the variable transmission may continuously shift through controlled and selective actuation of the clutch-brake 120a associated with the intermediary shaft 90 and the clutch-brake 120b associated with the secondary shaft 100.

TABLE I

Continuous Variability of Variable Speed Transmission

| Secondary Shaft Clutch-Brake (Down) | Intermediary Shaft Clutch-Brake (Across) | | |
|---|---|---|---|
| | Full Actuation | Partial Actuation | No Actuation |
| Full Actuation | Trans. Locked | N/A | Highest Gear |
| Partial Actuation | N/A | Mid Gear | High Gear |
| No Actuation | Lowest Gear | Mid Gear | Neutral |

As shown in Table I, by selectively controlling the clutch-brakes 120a, 120b torque may be selectively divided between the first geartrain 166 and the second geartrain 168 and then the output recombined to provide a particular torque ratio within the upper and lower limits defined by the geartrains 166, 168. Further, by selectively controlling and varying the actuation of the clutch-brakes 120a, 120b the speed-torque ratio may be continuously varied within the upper and lower limits of the variable speed transmission 10. It should be appreciated that particular selective controls of the clutch-brakes 120a, 120b are avoided in the operational embodiment of Table I. For example, the simultaneous full actuation of both clutch-brakes 120a, 120b would not occur in one embodiment to avoid transmission lock. By way of another example, if the secondary shaft clutch-brake 120b is partially activated while the intermediary shaft clutch-brake 120a is fully actuated, the ratio of the gear output will not change. Rather, braking the secondary shaft clutch-brake 120b acts as a brake on the secondary shaft 100 with no transfer of torque to the intermediary shaft 90 since the clutch-brake 120a is fully actuated. This has the undesirable result of increasing the engine load, brake load, and fuel consumption. A similar situation occurs with the full actuation of the secondary shaft clutch-brake 120b and the partial actuation of the intermediary shaft clutch-brake 120a.

Figure 7:
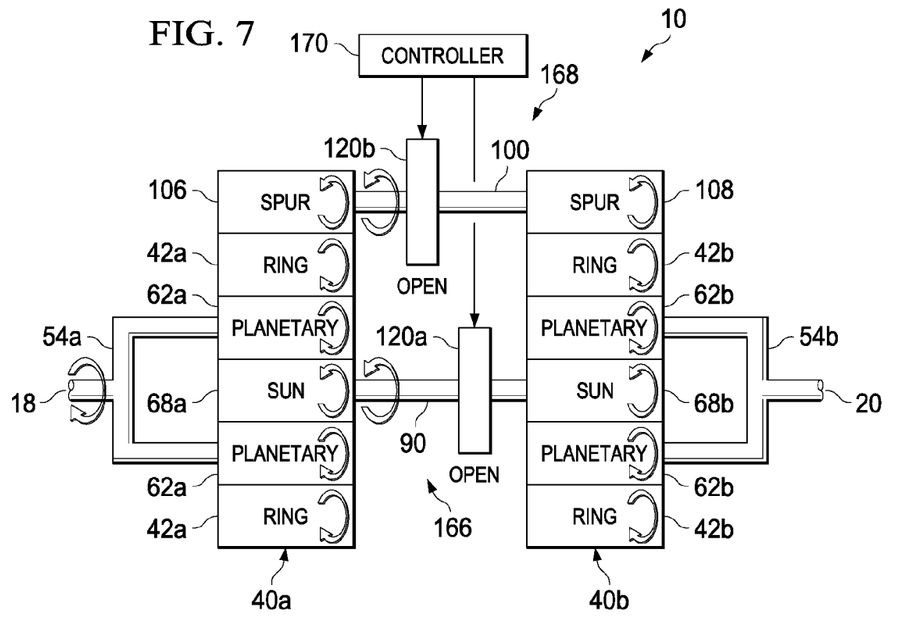
FIGS. 7 through 10 are schematic diagrams of one embodiment of the variable speed transmission wherein the variable speed transmission is varying the amount of torque transferred from a drive shaft to a driven shaft.
Figure 8:
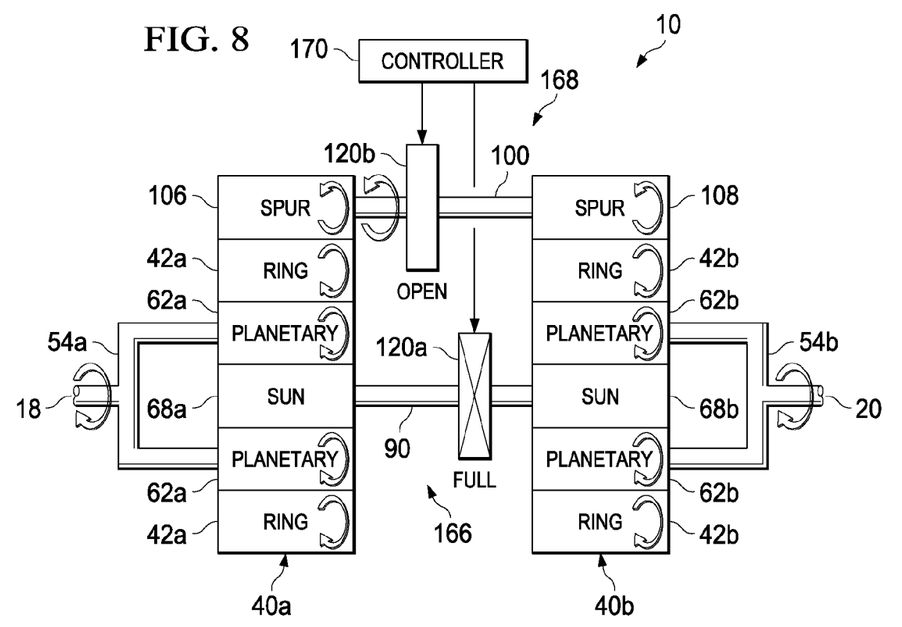
Figure 9:
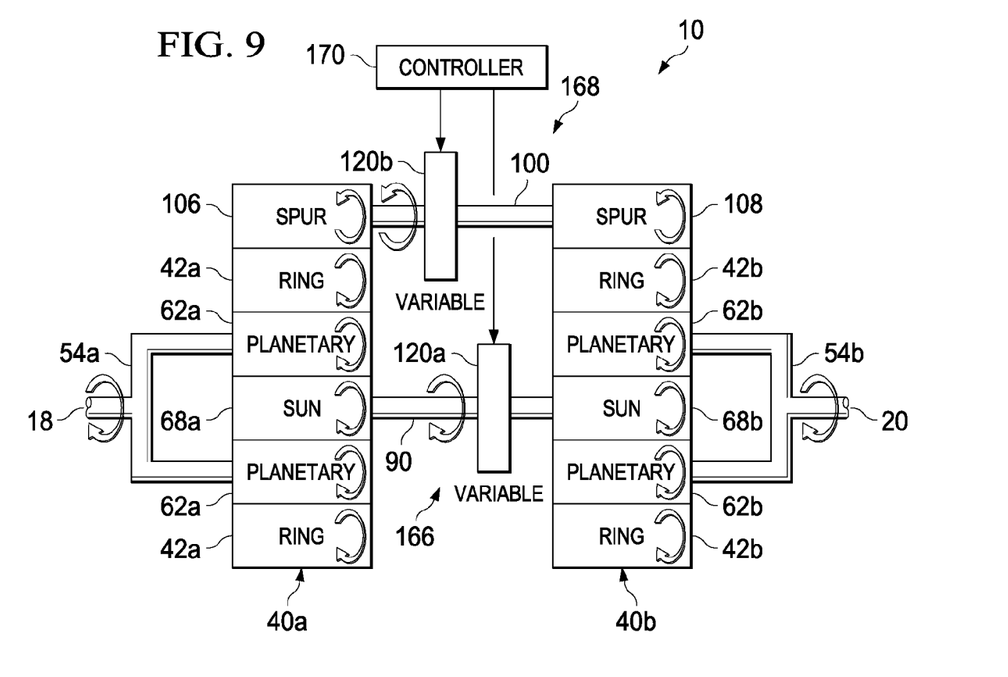
Figure 10:
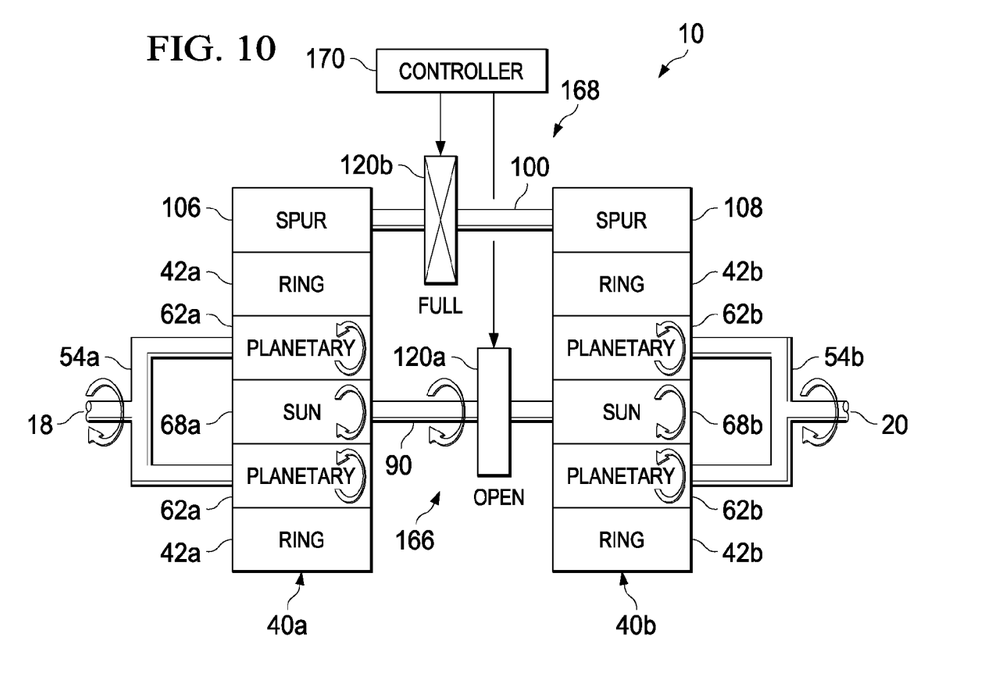

More specifically, FIGS. 7-10 illustrate the variable speed transmission varying from neutral in FIG. 7 to low gear in FIG. 8 through mid-gears in FIG. 9 to high gear in FIG. 10. With reference to FIG. 7, the variable speed transmission 10 is in neutral and the drive shaft 18 is supplying clockwise torque to the arms 60a of the planetary gearset 40a and onto the planetary gears 62a, which are turning concurrently clockwise with the drive shaft 18. In neutral, a controller 170 sends a control signal to each of the clutch-brakes 120a, 102b to coordinate no actuation and an open state of both of the clutch-brakes 120a, 120b to selectively stop the transfer of torque from the drive shaft 18 to the driven shaft 20. In particular, the control signal provided to the clutch-brake 120a permits only the counterclockwise rotation of the intermediary shaft 90. The drive shaft 18 rotates the planet carrier 54a and planetary gears 62a clockwise. As the intermediary shaft 90 is only permitted to rotate counterclockwise by the clutch-brake 120a, the sun gear 68a rotates counterclockwise in response to the rotational forces from the planetary gears 62a. This causes both the counterclockwise rotation of the intermediary shaft 90 and the sun gear 68b, which is permitted to freely rotate.

The ring gear 42a, which is rotatably coupled to the secondary shaft 100 by way of the spur gear 106, rotates clockwise while the secondary shaft 100 and the spur gear 108 rotate counterclockwise. This results in the clockwise rotation of the planetary gears 62b. As the planet gears 62b are rotating clockwise and the sun gear 68b is rotating counterclockwise, the planet carrier 56b does not rotate or cause the transfer of torque to the driven shaft 20. The counterclockwise rotation of the sun gears 68a, 68b causes the expenditure of torque and insufficient torque is present to cause the rotation of the planet carrier 56b and driven shaft 20 coupled for concurrent rotation thereto. It should be appreciated that in applications where the clockwise rotation of the intermediary shaft 90 is not restricted by the selective application of the clutch-brake 120a, the intermediary shaft 90 would still not turn clockwise due to the differences in gear ratios between the first and second geartrains 166, 168. The clutch-brake 120a is used to regulate the rotation of the shaft 90 to provide an assurance device that controls the rotation of the shaft 90 in mid-gear arrangements.

FIG. 8 illustrates a low gear application wherein the drive shaft 18 is supplying clockwise torque to the planetary gears 62a of the planetary gearset 40a. The controller 170 is completely halting the rotation of the intermediary shaft 90 with the electromagnetic clutch-brake 120a to selectively stop both clockwise and counterclockwise rotation. As a result, the sun gears 68a, 68b are stationary and the planetary gear 62a turns concurrently clockwise with the drive shaft 18. The ring gear 42a, which is meshed with the planetary gear 62a, rotates clockwise with the ring gear 42a. This transmission of torque rotates the spur gear 106, the secondary shaft 100, and the spur gear 108 counterclockwise. Torque is transferred from the spur gear 108 to the ring gear 42b to the planetary gears 62b, which rotate clockwise and provide clockwise torque through the arms 60b of the carrier 54b to the driven shaft 20. As with the sun gear 68a, the sun gear 68b is held stationary by the actuation of the clutch-brake 120a.

FIG. 9 depicts the variable speed transmission 10 in a mid-gear application. The electromagnetic clutch-brake 120a is actuated to selectively stop counterclockwise rotation of the intermediary shaft 90 and the sun gears 68a, 68b. In this operational embodiment, the torque from the drive shaft 18 is divided by the planetary gearset 40a between the geartrain 166 and the geartrain 168 and then recombined by the planetary gearset 40b to provide a slower speed and greater torque representing a mid-gear application between the minimum speed and maximum torque of the lowest gear ratio and the greatest speed and least torque of the highest gear ratio.

More specifically, in the geartrain 166, the drive shaft 18 provides clockwise torque to the planetary gears 62a which rotate the ring gear 42a and the sun gear 68a clockwise. The sun gear 68a is prevented from turning counterclockwise by the clutch-brake 120a, but allowed to turn clockwise as torque is gradually transferred from the secondary shaft 100 and the second geartrain 168 to the intermediary shaft 90 and the first geartrain 166 due to the application of braking forces on the intermediary shaft 90 by the gradual release of the clutch-brake 120a. The intermediary shaft 90 and the sun gear 68b also rotate clockwise to furnish input torque to the planetary gears 62b. In the geartrain 168, the planetary gears 62a rotate the ring gear 42a clockwise which rotates the spur gears 106, 108 and secondary shaft 100 counterclockwise. The spur gear 108 supplies input torque to the planetary gears 62b via the ring gear 42b. Output torque is transferred to the planet carrier 54b in a clockwise direction because sun gears 68a, 68b are prevented from turning in a counterclockwise direction of rotation by the actuation of clutch-brake 120a. The planetary gears 62b combine the torque from the sun gear 68b and the ring gear 42b to provide output torque through the driven shaft 20.

With respect to the continuous variability of the transmission 10, planetary gears 62a continue to apply clockwise rotational forces on the ring gear 42a. As clutch-brake 120b, which is coupled to the secondary shaft 100, is gradually actuated, i.e., applies a braking force to the secondary shaft 100, the planetary gears 62a will apply clockwise torque to the sun gear 68a which will transmit the torque through the intermediary shaft 90 to the sun gear 68b. In this mode of operation, the clutch-brake 120a will gradually permit clockwise motion of the intermediary shaft 90 as the clutch brake 120a is gradually transitioned from a fully actuated position that prevents clockwise rotation to a fully open position that permits clockwise rotation. The opening of the clutch-brake 120a is coordinated with the closure of the clutch-brake 120b to seamlessly transition the transmission through various gear ratios.

FIG. 10 depicts the variable speed transmission 10 in a high gear application. The electromagnetic clutch-brake 120b is fully actuated and the electromagnetic clutch-brake 120a is not actuated such that the selected geartrain will transfer all of the torque from the drive shaft 18 through the intermediary shaft 90 to the driven shaft 20. More particularly, the drive shaft 18 provides clockwise rotary motion to the planetary carrier 54a which rotates the planetary gears 62a counterclockwise since the ring gear 42a is being held stationary by the full actuation of the clutch-brake 120b. The planetary gears 62a, in turn, rotate the sun gear 68a, the intermediary shaft 90, and the sun gear 68b clockwise. The planetary gears 62b, in turn, are rotated counterclockwise and supply torque to the planet carrier 54b and the driven shaft 20 in a clockwise direction since the ring gear 42b and secondary shaft 100 are held stationary by the full actuation of the clutch-brake 120b.

As discussed, the coordinated actuation of each of the first and second clutch-brakes 120a, 120b substantially continuously varies the transmission of speed and torque from the drive shaft 18 to the driven shaft 20. As presented in FIGS. 7 through 10, in neutral, the clutch-brake 120a permits only counterclockwise rotation and prevents clockwise rotation and the clutch-brake 120b is not actuated. In the lowest gear, the clutch-brake 120a is fully actuated and the clutch-brake 120b remains open or not actuated. As the transmission 10 transitions through low to mid to high gears, the clutch-brake 120a is opened from the fully actuated position to not actuated as, in a coordinated manner, the clutch-brake 120b is transitioned from open to fully actuated. At the highest gear, the clutch-brake 120a is open and the clutch-brake 120b is fully actuated. Transitioning from the highest gear to the lowest gear or neutral, as will be appreciated, occurs in an opposite way.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A variable speed transmission comprising:
   a drive shaft operably coupled to a prime mover;
   a first planetary gearset rotatably coupled to the drive shaft, the first planetary gearset including a first sun gear, a first plurality of planetary gears drivenly connected to the drive shaft and disposed in an intermeshing relationship with the first sun gear, and a first ring gear having a first interior gear surface meshing with the first plurality of planetary gears and a first exterior gear surface;
   an intermediary shaft rotatably coupled to the first sun gear;
   a secondary shaft axially aligned and spaced with respect to the intermediary shaft;
   a first spur gear rotatably mounted to the secondary shaft, the first spur gear being meshed for opposing motion with the first exterior gear surface;
   a second spur gear rotatably mounted to the secondary shaft, the second spur gear located at an end opposite the first spur gear;
   a second planetary gearset rotatably coupled to the intermediary shaft, the second planetary gearset including a second sun gear drivenly connected for concurrent rotation to the intermediary shaft, a second plurality of planetary gears disposed in an intermeshing relationship with the second sun gear, and a second ring gear having a second interior gear surface meshing with the plurality of planetary gears and a second exterior gear surface meshing with the second spur gear;
   a driven shaft rotatably coupled to the second plurality of planetary gears, the driven shaft operably coupled to a rotary load;
   a first clutch-brake assembly coupled to the intermediary shaft, the first clutch-brake assembly operatively cooperating with the intermediary shaft to selectively hold the intermediary shaft stationary; and
   a second clutch-brake assembly coupled to the secondary shaft, the second clutch-brake assembly operatively cooperating with the secondary shaft to selectively hold the secondary shaft stationary.

2. The variable speed transmission as recited in claim 1, further comprising a controller disposed in communication with the first clutch-brake, the controller regulating the actuation of the first clutch-brake.

3. The variable speed transmission as recited in claim 1, further comprising a controller disposed in communication with the first and second clutch-brakes, the controller for regulating and coordinating the actuation of the first and second clutch-brakes.

4. The variable speed transmission as recited in claim 1, wherein the first exterior gear surface and the first spur gear comprise identical pitches.

5. The variable speed transmission as recited in claim 1, wherein the first exterior gear surface and the first spur gear comprise different pitches.

6. The variable speed transmission as recited in claim 1, wherein the second exterior gear surface and the second spur gear comprise identical pitches.

7. The variable speed transmission as recited in claim 1, wherein the second exterior gear surface and the second spur gear comprise different pitches.

8. The variable speed transmission as recited in claim 1, wherein a ratio between the first exterior gear surface and the first spur gear is different than a ratio between the second exterior gear surface and the second spur gear.

9. The variable speed transmission as recited in claim 1, further comprising a housing for journaling each of the drive shaft, secondary shaft, and driven shaft therein.

10. The variable speed transmission as recited in claim 1, wherein the coordinated actuation of each of the first and second clutch-brake assemblies substantially continuously varies the transmission of torque from the drive shaft to the driven shaft.

11. The variable speed transmission as recited in claim 1, wherein in a gear application, the first clutch-brake assembly is actuated to discontinue transfer of torque through the intermediary shaft from the first sun gear to the second sun gear.

12. The variable speed transmission as recited in claim 1, wherein in a gear application, the second clutch-brake assembly is actuated to discontinue transfer of torque through the secondary shaft from the first ring gear to the second ring gear.

13. The variable speed transmission as recited in claim 1, wherein in a gear application, both the first and second clutch-brake assemblies are opened to discontinue transfer of torque from the drive shaft to the driven shaft.

14. The variable speed transmission as recited in claim 1, further comprising a reverse subassembly coupled to the driven shaft for opposing rotation, the reverse subassembly reversing the direction of output torque provided by the variable speed transmission.

15. A variable speed transmission comprising:
   a drive shaft operably coupled to a prime mover;
   a first planetary gearset rotatably coupled to the drive shaft, the first planetary gearset including a first sun gear, a first plurality of planetary gears drivenly connected to the drive shaft and disposed in an intermeshing relationship with the first sun gear, and a first ring gear having a first interior gear surface meshing with the first plurality of planetary gears and a first exterior gear surface;
   an intermediary shaft rotatably coupled to the first sun gear;
   a secondary shaft axially aligned and spaced with respect to the intermediary shaft;
   a first spur gear rotatably mounted to the secondary shaft, the first spur gear being meshed for opposing motion with the first exterior gear surface;

a second spur gear rotatably mounted to the secondary shaft, the second spur gear located at an end opposite the first spur gear;

a second planetary gearset rotatably coupled to the intermediary shaft, the second planetary gearset including a second sun gear drivenly connected for concurrent rotation to the intermediary shaft, a second plurality of planetary gears disposed in an intermeshing relationship with the second sun gear, and a second ring gear having a second interior gear surface meshing with the plurality of planetary gears and a second exterior gear surface meshing with the second spur gear;

a driven shaft rotatably coupled to the second plurality of planetary gears, the driven shaft operably coupled to a rotary load;

first means for controlling transfer of torque through the intermediary shaft from the first sun gear to the second sun gear; and second means for controlling transfer of torque through the secondary shaft from the first ring gear to the second ring gear.

16. The variable speed transmission as recited in claim 15, wherein the first and second means for controlling transfer of torque form an identical means.

17. The variable speed transmission as recited in claim 15, wherein the first and second means for controlling transfer of torque are under common control.

18. A variable speed transmission comprising:
a drive shaft operably coupled to a prime mover;
a driven shaft operably coupled to a rotary load;
a first planetary gearset rotatably coupled to the drive shaft;
a second planetary gearset rotatably coupled to the driven shaft;
an intermediary shaft rotatably coupling the first planetary gearset to the second planetary gearset in a geartrain having a first ratio;
a secondary shaft axially aligned and spaced with respect to the intermediary shaft, the secondary shaft rotatably coupling the first planetary gearset in a geartrain having a second ratio;
a first clutch-brake assembly coupled to the intermediary shaft, the first clutch-brake assembly operatively cooperating with the intermediary shaft to selectively hold the intermediary shaft stationary; and
a second clutch-brake assembly coupled to the secondary shaft, the second clutch-brake assembly operatively cooperating with the secondary shaft to selectively hold the secondary shaft stationary.

19. The variable speed transmission as recited in claim 18, further comprising a controller disposed in communication with the first clutch-brake, the controller regulating the actuation of the first clutch-brake.

20. The variable speed transmission as recited in claim 18, further comprising a controller disposed in communication with the first and second clutch-brakes, the controller for regulating and coordinating the actuation of the first and second clutch-brakes.

21. A variable speed transmission comprising:
a drive shaft operably coupled to a prime mover;
a driven shaft operably coupled to a rotary load;
a compound planetary gearset interposed for rotation between the drive shaft and the driven shaft, the compound planetary gearset receiving torque from the drive shaft and providing torque to the driven shaft;
a first geartrain defining a first gear ratio and forming a potion of the compound planetary gearset, the first geartrain including a first plurality of planetary gears drivenly connected to the drive shaft and disposed in an intermeshing relationship with a first sun gear, the first sun gear rotatably coupled to an intermediary shaft supplying torque to a second sun gear, the second sun gear meshing with a second plurality of planetary gears drivingly connected to the driven shaft;
a second geartrain defining a second gear ratio and forming a portion of the compound planetary gearset, the second geartrain including the first plurality of planetary gears drivenly connected to the drive shaft and disposed in an intermeshing relationship with a first ring gear, the first ring gear being rotatably coupled to a secondary shaft having a pair of spur gears rotatably mounted thereon, the secondary shaft supplying torque to a second ring gear meshing with the second plurality of planetary gears drivingly connected to the driven shaft;
a first clutch-brake assembly coupled to the first geartrain, the first clutch-brake assembly operatively cooperating with the first geartrain to selectively stop the transfer of torque therethrough;
a second clutch-brake assembly coupled to the second geartrain, the second clutch-brake assembly operatively cooperating with the second geartrain to selectively stop the transfer of torque therethrough; and
a controller communicatively disposed with the first and second clutch-brake assemblies, the controller selectively coordinating the actuation of the first and second clutch-brake assemblies, thereby providing for continuously variable torque and speed between the first and second gear ratios.

22. The variable speed transmission as recited in claim 21, wherein the first and second clutch-brake assemblies comprises components selected from the group consisting of electromagnetic clutch-brakes, single plate, multi-plate, and hydrostatic brakes, oil-pump brake assemblies, and hydraulic clutch-brake assemblies.

23. The variable speed transmission as recited in claim 21, wherein the controller comprises a component selected from the group consisting of mechanical controllers, hydraulic controllers, electromechanical controllers, and electrical controllers.

* * * * *